(12) United States Patent
Miyamoto

(10) Patent No.: US 9,919,419 B2
(45) Date of Patent: Mar. 20, 2018

(54) ROBOT SYSTEM AND EMERGENCY STOP PROCESSING APPARATUS

(71) Applicant: Seiko Epson Corporation, Tokyo (JP)

(72) Inventor: Yoshito Miyamoto, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/168,653

(22) Filed: May 31, 2016

(65) Prior Publication Data
US 2016/0346919 A1 Dec. 1, 2016

(30) Foreign Application Priority Data
Jun. 1, 2015 (JP) .................................. 2015-111142

(51) Int. Cl.
*B25J 9/16* (2006.01)
*G05B 19/425* (2006.01)

(52) U.S. Cl.
CPC ............... *B25J 9/16* (2013.01); *G05B 19/425* (2013.01); *G05B 2219/36162* (2013.01); *G05B 2219/50198* (2013.01); *Y10S 901/03* (2013.01)

(58) Field of Classification Search
CPC ........ G05B 19/425; G05B 2219/36162; G05B 2219/50198; Y10S 901/03
See application file for complete search history.

(56) References Cited

U.S. PATENT DOCUMENTS

| 5,444,342 A | * | 8/1995 | Matsuo | B25J 9/1674 |
| | | | | 318/563 |
| 2004/0078116 A1 | * | 4/2004 | Hashimoto | B25J 13/06 |
| | | | | 700/264 |
| 2005/0209734 A1 | | 9/2005 | Tanaka et al. | |
| 2006/0214618 A1 | * | 9/2006 | Hashimoto | G05B 19/406 |
| | | | | 318/445 |
| 2007/0096674 A1 | * | 5/2007 | Hashimoto | B25J 9/1674 |
| | | | | 318/568.13 |
| 2010/0106299 A1 | * | 4/2010 | Nagata | B25J 13/06 |
| | | | | 700/264 |

FOREIGN PATENT DOCUMENTS

| JP | 60-218110 A | 10/1985 |
| JP | 04-330501 A | 11/1992 |
| JP | 07-164373 A | 6/1995 |
| JP | 2001-337761 A | 12/2001 |
| JP | 2003-311665 A | 11/2003 |
| JP | 2011-197858 A | 10/2011 |
| JP | 2014-193517 A | 10/2014 |
| WO | WO-95-009718 A1 | 4/1995 |

* cited by examiner

*Primary Examiner* — Dale Moyer
(74) *Attorney, Agent, or Firm* — Harness, Dickey & Pierce, P.L.C.

(57) ABSTRACT

A robot system includes a robot, a control apparatus that controls the robot, a teaching apparatus having a first operation part that makes an emergency stop of a motion of the robot and teaching the motion of the robot, and an emergency stop processing apparatus having a second operation part that continues the motion of the robot after the first operation part is operated, wherein the second operation part is separately provided from the control apparatus.

10 Claims, 8 Drawing Sheets

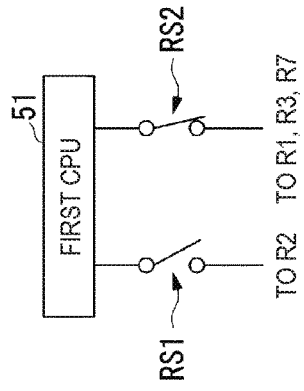
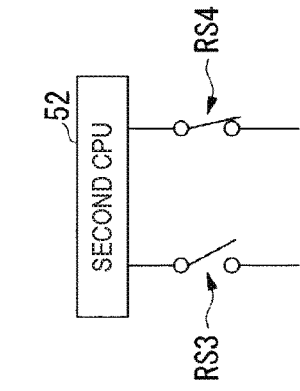
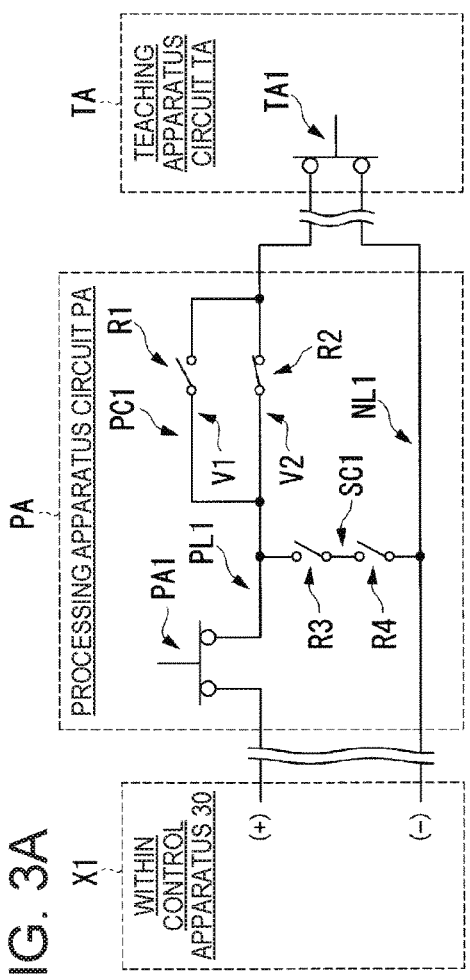

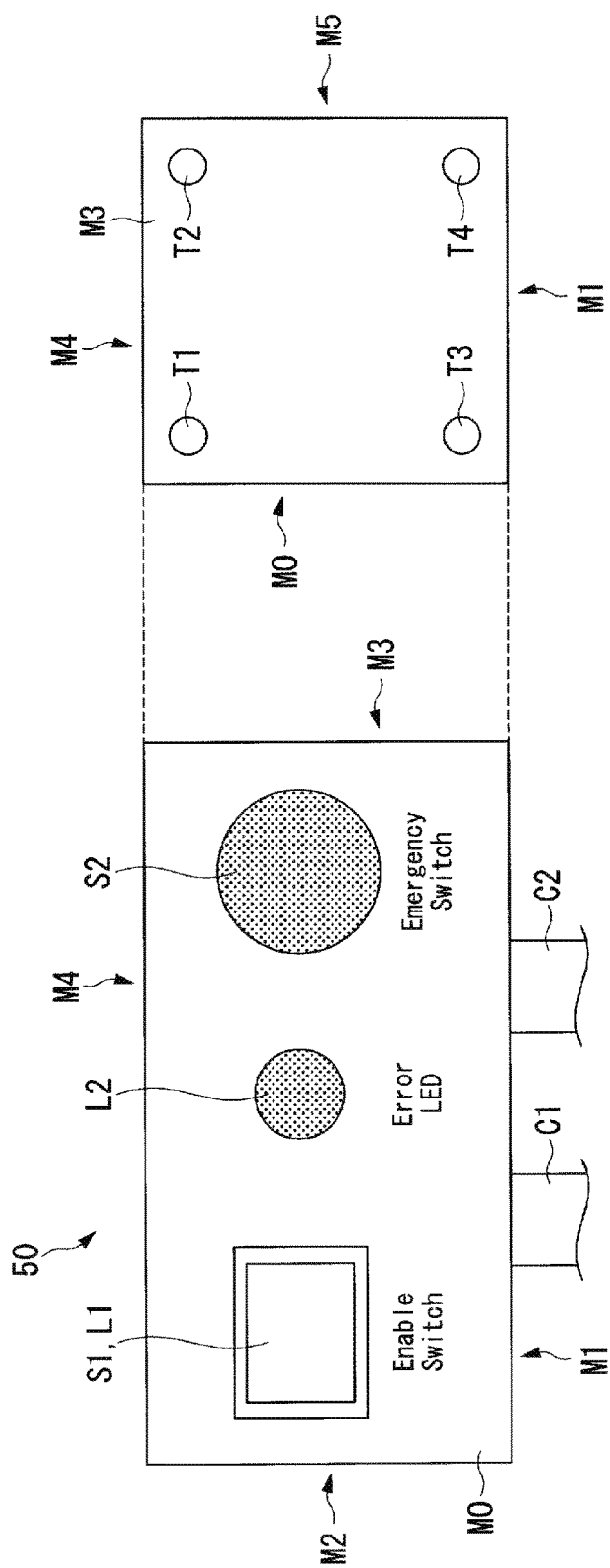
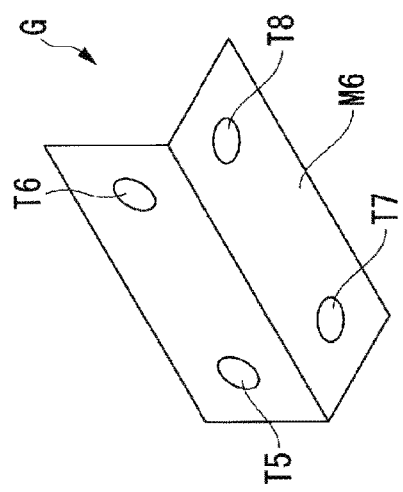
FIG. 7A
FIG. 7B
FIG. 7C

ROBOT SYSTEM AND EMERGENCY STOP PROCESSING APPARATUS

BACKGROUND

1. Technical Field

The present invention relates to a robot system and an emergency stop processing apparatus.

2. Related Art

In sites where works are performed by robots, teaching apparatuses for teaching motions to the robots (e.g. teaching pendants; TP) are often used. In the teaching apparatus, an emergency stop button for emergency stop of the robot is provided. In this case, when the teaching apparatus is detached from the robot, an emergency stop circuit is interrupted and an emergency stop error occurs. In the case where the emergency stop error occurs, peripherals connected to the robot must be restarted.

On the other hand, in the sites where works are performed by robots, a single teaching apparatus is often used for teaching motions to the robots. In this case, a user must repeatedly attach and detach the teaching apparatus to and from the robots.

In this regard, an industrial robot including an emergency stop cancel switch for preventing an emergency stop error even when the teaching apparatus is detached is known (see Patent Document 1 (Re-publication WO95/09718)).

However, in an industrial robot of related art, an emergency stop cancel switch is provided in a control apparatus for operating the industrial robot, and it is impossible to detach the teaching robot without causing an emergency stop error in a location apart from the industrial robot. As a result, it is difficult to improve efficiency of teaching work by the user in the industrial robot.

SUMMARY

An aspect of the invention is directed to a robot system including a robot, a control apparatus that controls the robot, a teaching apparatus having a first operation part that makes an emergency stop of a motion of the robot and teaching the motion of the robot, and an emergency stop processing apparatus having a second operation part that continues the motion of the robot after the first operation part is operated, wherein the second operation part is separately provided from the control apparatus.

According to this configuration, the robot system makes an emergency stop of the motion of the robot by the first operation part of the teaching apparatus and continues the motion of the robot by the second operation part of the emergency stop processing apparatus separately provided from the control apparatus after the first operation part is operated. Thereby, the robot system may improve efficiency of teaching work.

As another aspect of the invention, the robot system may be configured such that the emergency stop processing apparatus is communicably connected between the control apparatus and the teaching apparatus.

According to this configuration, in the robot system, the first operation part is operated, the emergency stop processing apparatus communicably connected between the control apparatus and the teaching apparatus continues the motion of the robot. Thereby, the robot system may improve the efficiency of teaching work by the emergency stop processing apparatus communicably connected between the control apparatus and the teaching apparatus.

As another aspect of the invention, the robot system may be configured such that the emergency stop processing apparatus includes an informing part that informs that the second operation part has been operated.

According to this configuration, the robot system informs that the second operation part is operated by the informing part. Thereby, the robot system may inform the user that the second operation part is operated, by the informing part. As a result, the robot system may suppress detachment of the teaching apparatus by the user without any operation of the second operation part.

As another aspect of the invention, the robot system may be configured such that the emergency stop processing apparatus includes a third operation part that makes an emergency stop of the motion of the robot.

According to this configuration, the robot system makes an emergency stop of the motion of the robot by the third operation part of the emergency stop processing apparatus. Thereby, the robot system may make an emergency stop of the robot even when the teaching apparatus is detached.

As another aspect of the invention, the robot system may be configured such that the emergency stop processing apparatus can switch relays by an operation of the second operation part.

According to this configuration, the robot system switches the relays by the second operation part of the emergency stop processing apparatus. Thereby, the robot system may continue the motion of the robot after the first operation part is operated based on switching of the relays by the second operation part.

As another aspect of the invention, the robot system may be configured such that the emergency stop processing apparatus includes a first processor and a second processor that switch the relays.

According to this configuration, the robot system switches the relays by the first processor and the second processor. Thereby, the robot system may continue the motion of the robot after the first operation part is operated as a result of switching of the relays by the first processor and the second processor.

As another aspect of the invention, the robot system may be configured such that, in the emergency stop processing apparatus, the first processor and the second processor monitor each other.

According to this configuration, the robot system allows the first processor to monitor the second processor and allows the second processor to monitor the first processor. Thereby, the robot system may monitor the first processor and the second processor.

As another aspect of the invention, the robot system may be configured such that the relays includes first relays and second relays, and the emergency stop processing apparatus switches the first relays by the first processor and switch the second relays by the second processor.

According to this configuration, in the robot system, the first relays are switched by the first processor and the second relays are switched by the second processor. Thereby, the robot system may switch the first relays and the second relays by the different processors.

As another aspect of the invention, the robot system may be configured such that the emergency stop processing apparatus includes a plurality of fixing portions that fix a jig to the emergency stop processing apparatus.

According to this configuration, in the robot system, the jig is fixed to the emergency stop processing apparatus using one of the plurality of fixing portions. Thereby, the robot system may fix the emergency stop processing apparatus using the fixing portion suitable for a location to fix.

Another aspect of the invention is directed to an emergency stop processing apparatus including a second operation part that continues a motion of a robot after a first operation part provided in a teaching apparatus that teaches the motion of the robot and making an emergency stop of the motion of the robot is operated, wherein the second operation part is separately provided from a control apparatus that controls the robot.

According to this configuration, the emergency stop processing apparatus continues the motion of the robot, after the first operation part is operated, by the second operation part separately provided from the control apparatus. Thereby, the emergency stop processing apparatus may improve the efficiency of teaching work.

As described above, the robot system and the emergency stop processing apparatus continue the motion of the robot, after the first operation part is operated, by the second operation part separately provided from the control apparatus. Thereby, the robot system and the emergency stop processing apparatus may improve the efficiency of teaching work.

BRIEF DESCRIPTION OF THE DRAWINGS

The invention will be described with reference to the accompanying drawings, wherein like numbers reference like elements.

FIGS. 3A to 3D show examples of configurations of emergency stop circuits in the robot system.

FIGS. 7A to 7C show an example of the appearance of the emergency stop processing apparatus and an example of a jig for fixing the emergency stop processing apparatus.

DESCRIPTION OF EXEMPLARY EMBODIMENTS

Embodiment

Figure 1:
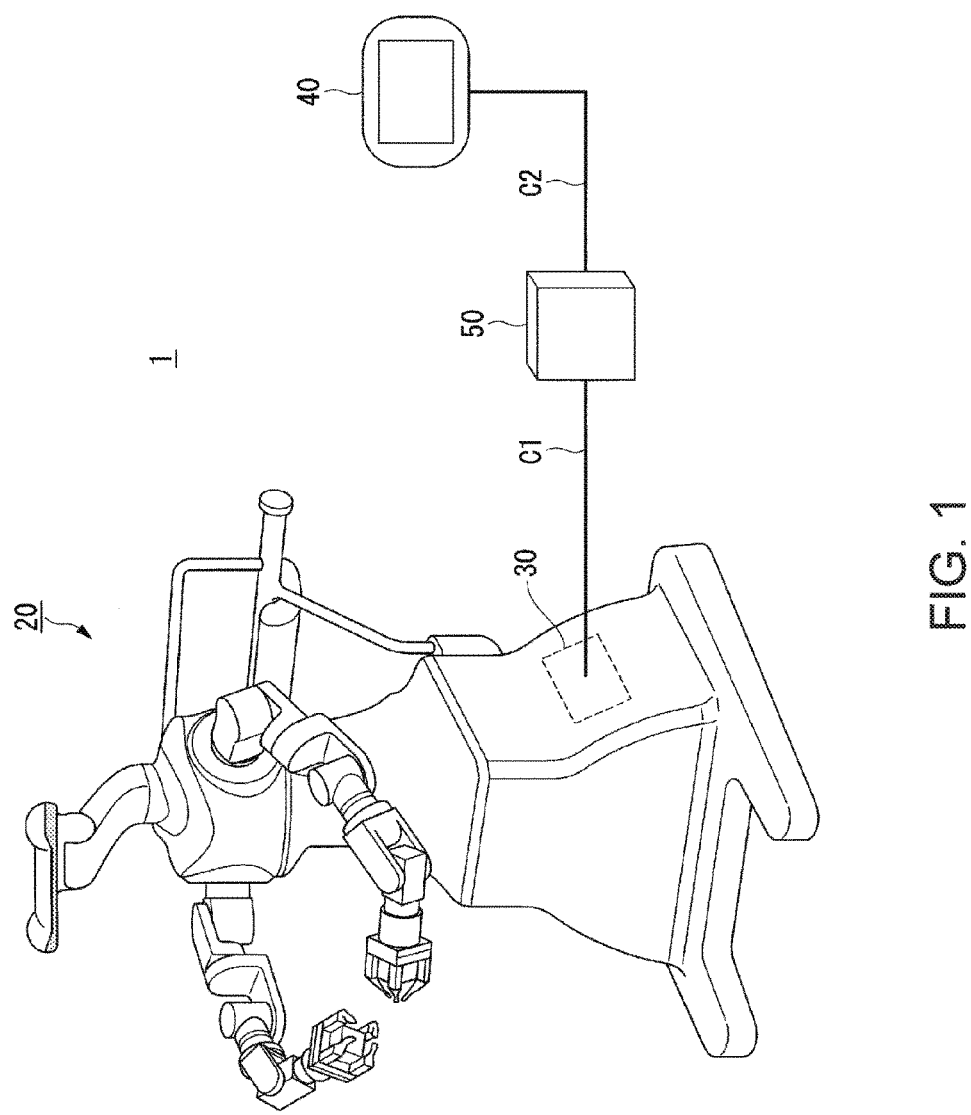
FIG. 1 is a configuration diagram showing an example of a robot system according to an embodiment.

Hereinafter, an embodiment of the invention will be explained with reference to the drawings. FIG. 1 is a configuration diagram showing an example of a robot system 1 according to the embodiment. The robot system 1 includes a robot 20, a teaching apparatus 40, and an emergency stop processing apparatus 50. Further, the robot 20 includes a control apparatus 30.

First, connections between the respective configurations in the robot system 1 shown in FIG. 1 will be explained.

In the robot system 1, the control apparatus 30 and the emergency stop processing apparatus 50 are communicably connected by a cable C1. Further, in the robot system 1, the emergency stop processing apparatus 50 and the teaching apparatus 40 are communicably connected by a cable C2. Namely, in the robot system 1, the emergency stop processing apparatus 50 is communicably connected between the control apparatus 30 and the teaching apparatus 40. Wired communications via the cable C1 and the cable C2 are performed according to standards of e.g. Ethernet (registered trademark), USB (Universal Serial Bus), or the like.

Note that the control apparatus 30 may be connected to the emergency stop processing apparatus 50 via wireless communications performed according to communication standards of Wi-Fi (registered trademark) or the like. Further, the teaching apparatus 40 may be connected to the emergency stop processing apparatus 50 via wireless communications performed according to communication standards of Wi-Fi (registered trademark) or the like. Note that, in the robot system 1, in case of an emergency stop of the robot 20 via the teaching apparatus 40 and the emergency stop processing apparatus 50 by the user, it is desirable that the communications via the cable C1 and the cable C2 are wired communications in a location where wireless communications are unstable.

Next, the respective configurations of the robot system 1 will be explained.

The robot 20 is a dual-arm robot including the control apparatus 30. The dual-arm robot is a robot having two arms. Each arm includes an end effector, a manipulator, and a plurality of actuators. Note that the robot 20 may be a single-arm robot, a parallel-link robot, an orthogonal robot, a single-axis robot, or a scalar robot in place of the dual-arm robot. The single-arm robot is a robot having a single arm.

The respective actuators are communicably connected to the control apparatus 30 built in the robot 20 via cables. Thereby, the actuators may move the end effectors and the manipulators based on control signals acquired from the control apparatus 30. Note that wired communications via the cables are performed according to standards of e.g. Ethernet (registered trademark), USB (Universal Serial Bus), or the like. Further, part or all of the actuators may be connected to the control apparatus 30 via wireless communications performed according to communication standards of Wi-Fi (registered trademark) or the like. The robot 20 may have a configuration controlled by a control apparatus 30 provided outside, i.e., a control apparatus 30 separately provided from the robot 20 in place of the configuration containing the control apparatus 30.

The control apparatus 30 transmits the control signals to the respective functional parts of the robot 20. Thereby, the control apparatus 30 operates the robot 20. Further, the control apparatus 30 operates the robot 20 based on information representing one or more motions taught by the teaching apparatus 40. Furthermore, the control apparatus 30 includes an emergency stop unit (not shown) and an emergency stop cancel unit (not shown). The emergency stop unit makes an emergency stop of the robot 20. The emergency stop unit makes an emergency stop of the robot 20 when the state of the emergency stop circuit in the robot system 1 changes from an energized state to a non-energized state. In the example, the energized state of the emergency stop circuit refers to a state in which a current flows in a predetermined part of a path forming the emergency stop circuit. Further, the non-energized state of the emergency stop circuit refers to a state in which no current flows in the predetermined part of the path forming the emergency stop circuit.

The emergency stop circuit is a circuit realized in a condition in which the control apparatus 30 is connected to the emergency stop processing apparatus 50 via the cable C1 and the emergency stop processing apparatus 50 is connected to the teaching apparatus 40 via the cable C2. Further, the predetermined part of the path forming the emergency stop circuit refers to e.g. a path of the control apparatus 30 of a part of the path forming the emergency stop circuit. Note that the predetermined part of the path forming the emergency stop circuit may refer to another path of the part of the path forming the emergency stop circuit. That is, in the robot system 1, if a current no longer flows in the predetermined part of the path forming the emergency stop circuit by detachment of one of the cable C1, the emergency stop processing apparatus 50, the cable C2, and the teaching apparatus 40 from the control apparatus 30, the control apparatus 30 makes an emergency stop of the robot 20.

Or, in the robot system 1, in the condition that the control apparatus 30 is connected to the emergency stop processing apparatus 50 via the cable C1 and the emergency stop processing apparatus 50 is connected to the teaching apparatus 40 via the cable C2, a configuration in which two or more emergency stop circuits are realized may be employed in place of the configuration in which the single emergency stop circuit is realized. As below, as an example, the case where there are two emergency stop circuits in the robot system 1 will be explained. Hereinafter, one emergency stop circuit is referred to as "emergency stop circuit A" and the other emergency stop circuit is referred to as "emergency stop circuit B". Further, hereinafter, when it is not necessary to distinguish between the emergency stop circuit A and the emergency stop circuit B, the emergency stop circuits are collectively referred to as "emergency stop circuit".

When the robot system 1 includes the two emergency stop circuits, the control apparatus 30 makes an emergency stop of the robot 20 when the state of one of the emergency stop circuit A and the emergency stop circuit B changes from the energized state to the non-energized state. This is because, in view of safety, it is desirable that the control apparatus 30 makes an emergency stop of the robot 20 when the state of one of the emergency stop circuit A and the emergency stop circuit B changes from the energized state to the non-energized state. Note that the control apparatus 30 may make an emergency stop of the robot 20 when both states of the emergency stop circuit A and the emergency stop circuit B change from the energized states to the non-energized states instead.

The emergency stop cancel unit switches the operation mode of the control apparatus 30 to an operation mode in which an emergency stop of the robot 20 is not made even when the state of the emergency stop circuit changes from the energized state to the non-energized state based on an operation received from the user. For example, the emergency stop cancel unit switches the operation mode of the control apparatus 30 to an operation mode in which an emergency stop of the robot 20 is not made when a first emergency stop cancel button provided on the surface of the control apparatus 30 is pressed down.

The teaching apparatus 40 provides to the user an interface that may teach information representing a motion of the robot 20 to the control apparatus 30 using a GUI (Graphical User Interface) realized by a dedicated application. The teaching apparatus 40 teaches information representing a motion of the robot 20 to the control apparatus 30 based on an operation received from the user via the GUI. Further, the teaching apparatus 40 includes a jog for jog motion of the robot 20. The jog may be provided as a hardware functional part such as a button in the teaching apparatus 40, or provided as a software functional part provided to the user by the GUI of the teaching apparatus 40.

Furthermore, the teaching apparatus 40 includes a first emergency stop button for changing the state of the emergency stop circuit from the energized state to the non-energized state. Hereinafter, for convenience of explanation, a path of the teaching apparatus 40 of a part of the path forming the emergency stop circuit A is referred to as "teaching apparatus circuit TA" and a path of the teaching apparatus 40 of a part of the path forming the emergency stop circuit B is referred to as "teaching apparatus circuit TB". Or, when it is not necessary to distinguish between the teaching apparatus circuit TA and the teaching apparatus circuit TB, the teaching apparatus circuits are collectively referred to as "teaching apparatus circuit". Each of the teaching apparatus circuit TA and the teaching apparatus circuit TB includes at least one switch corresponding to the first emergency stop button. The teaching apparatus 40 switches the the state of the switch to off when the first emergency stop button is pressed down and changes the states of the emergency stop circuit A and the emergency stop circuit B from the energized states to the non-energized states. Thereby, the teaching apparatus 40 may allow the control apparatus 30 to make an emergency stop of the robot 20. The first emergency stop button is an example of a first operation part. Note that, in the embodiment, the on state of the switch refers to a state in which the switch is closed and the off state of the switch refers to a state in which the switch is opened.

The emergency stop processing apparatus 50 includes a second emergency stop button for making an emergency stop of the robot 20. Hereinafter, for convenience of explanation, a path of the emergency stop processing apparatus 50 of a part of the path forming the emergency stop circuit A is referred to as "processing apparatus circuit PA" and a path of the emergency stop processing apparatus 50 of a part of the path forming the emergency stop circuit B is referred to as "processing apparatus circuit PB". Or, when it is not necessary to distinguish between the processing apparatus circuit PA and the processing apparatus circuit PB, the processing apparatus circuits are collectively referred to as "processing apparatus circuit". Each of the processing apparatus circuit PA and the processing apparatus circuit PB includes at least one switch corresponding to the second emergency stop button. The emergency stop processing apparatus 50 switches the state of the switch to off when the second emergency stop button is pressed down, and changes the states of the emergency stop circuit A and the emergency stop circuit B from the energized states to the non-energized states. Thereby, the emergency stop processing apparatus 50 may allow the control apparatus 30 to make an emergency stop of the robot 20. The second emergency stop button is an example of a third operation part.

Further, the emergency stop processing apparatus 50 includes a second emergency stop cancel button for holding the state of the emergency stop circuit in the energized state even when disconnected from the teaching apparatus 40 (e.g. when the cable C2 is detached from the emergency stop processing apparatus 50, when the teaching apparatus 40 is detached from the cable C2, or the like) or when the first emergency stop button of the teaching apparatus 40 is pressed down.

Each of the processing apparatus circuit PA and the processing apparatus circuit PB includes at least one switch corresponding to the second emergency stop cancel button. The switch connects a path on the positive side extending to the control apparatus 30 side, not contained in the cable C2 of the processing apparatus circuit and a path on the negative side extending to the control apparatus 30 side, not contained in the cable C2 of the processing apparatus circuit. Thereby, the state of the emergency stop circuit is held in the energized state even when the cable C2 is detached from the emergency stop processing apparatus 50, when the teaching apparatus 40 is detached from the cable C2, or when the first emergency stop button of the teaching apparatus 40 is pressed down. As below, a situation that at least one of the first emergency stop cancel button and the second emergency stop cancel button is pressed down and the state of the emergency stop circuit is held in the energized state will be referred to as cancellation of emergency stop and explained. The second emergency stop cancel button is an example of a second operation part.

Figure 2:
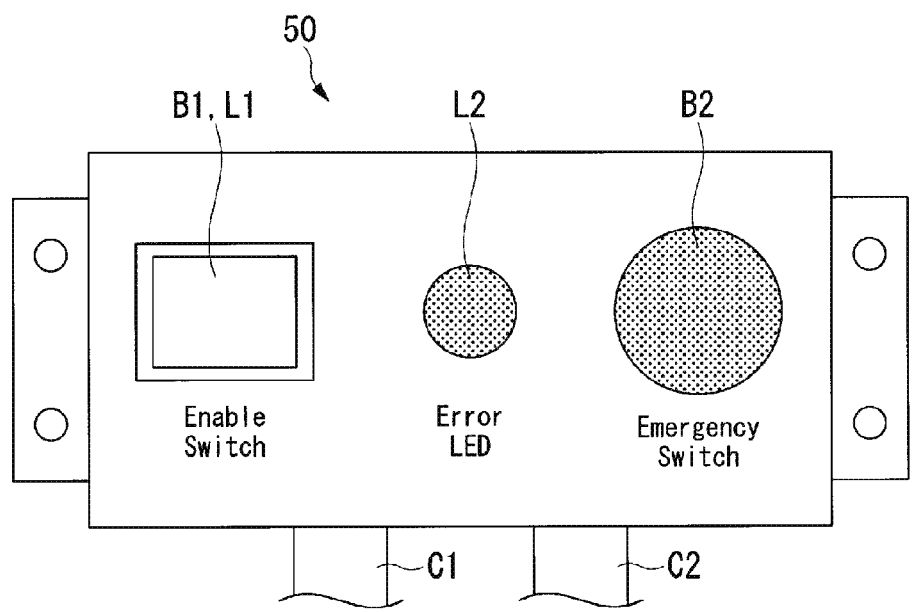
FIG. 2 shows an example of an appearance of an emergency stop processing apparatus.

Here, referring to FIG. 2, an appearance of the emergency stop processing apparatus 50 will be explained. FIG. 2 shows an example of the appearance of the emergency stop processing apparatus 50. As shown in FIG. 2, the emergency stop processing apparatus 50 includes a second emergency stop cancel button B1, a second emergency stop button B2, a display part L1, and a display part L2.

The display part L1 is provided on the surface of the second emergency stop cancel button B1. The display part L1 displays that the second emergency stop cancel button B1 has been pressed down, in other words, an emergency stop has been cancelled. The display part L1 is, in the example, an LED (Light Emitting Diode). The display part L1 shows that the second emergency stop cancel button B1 has been pressed down, by lighting. Note that the display part L1 may be a display that displays that the second emergency stop cancel button B1 has been pressed down, by a character or symbol in place of the LED or the like. Further, the emergency stop processing apparatus 50 may include another functional part including a speaker or a vibrator that vibrates the emergency stop processing apparatus 50 in place of the display part L1. In the case where the emergency stop processing apparatus 50 includes a speaker, the apparatus informs the user that the second emergency stop cancel button B1 has been pressed down, by sound from the speaker. The display part L1 is an example of an informing part.

The display part L2 displays that the state of the emergency stop circuit has changed from the energized state to the non-energized state, in other words, an emergency stop of the robot 20 has been made. The display part L2 is, in the example, an LED. The display part L2 shows that the state of the emergency stop circuit has changed from the energized state to the non-energized state, by lighting. For example, the display part L2 turns on the light when the second emergency stop cancel button B1 is not pressed down but the second emergency stop button B2 is pressed down, because the state of the emergency stop circuit changes from the energized state to the non-energized state. Note that the display part L2 may be a display that displays that the state of the emergency stop circuit has changed from the energized state to the non-energized state, by a character or symbol in place of the LED or the like. Further, the emergency stop processing apparatus 50 may include another functional part including a speaker or a vibrator that vibrates the emergency stop processing apparatus 50 in place of the display part L2. In the case where the emergency stop processing apparatus 50 includes a speaker, the apparatus informs the user that the state of the emergency stop circuit has changed from the energized state to the non-energized state, by sound from the speaker.

The emergency stop processing apparatus 50 can freely change its installation position by changing the lengths of the cable C1 and the cable C2. That is, the emergency stop processing apparatus 50 can be installed near a location where the user performs work using the teaching apparatus 40. As described above, the emergency stop processing apparatus 50 is provided separately from the control apparatus 30, and thereby, in the robot system 1, the second emergency stop cancel button B1 may be pressed down in a location apart from the control apparatus 30 and the teaching apparatus 40 may be detached with the state of the emergency stop circuit held in the energized state. As a result, the robot system 1 may improve efficiency of teaching work.

For example, in the case where the single teaching apparatus 40 teaches information representing motions to the control apparatuses 30 respectively built in the robots 20, the robot system 1 improves efficiency of the teaching work. In this case, when the teaching apparatus 40 is detached from the first robot 20 and connected to the second robot 20, the teaching apparatus 40 may be detached from the first robot 20 without moving the control apparatus 30 to a location where the control apparatus 30 may be operated for pressing down the first emergency stop cancel button provided on the surface of the control apparatus 30 of the first robot 20.

Further, the emergency stop processing apparatus 50 includes the display part L1, and thereby, the robot system 1 may visually inform the user whether or not the current state is a state in which an emergency stop of the robot 20 can be made (whether or not the second emergency stop cancel button B1 is pressed down). As a result, the robot system 1 may suppress continued motion of the robot 20 even in the state in which the user unintentionally presses down the second emergency stop cancel button B1.

Furthermore, the emergency stop processing apparatus 50 includes the second emergency stop button B2, and thereby, even when the user is in a location apart from the control apparatus 30 and the teaching apparatus 40, the robot system 1 may make an emergency stop of the robot 20 by pressing down of the second emergency stop button B2. Note that, as will be described later, when the second emergency stop button B2 is pressed down, the emergency stop processing apparatus 50 does not cancel an emergency stop of the robot 20 and allows the control apparatus 30 to make an emergency stop of the robot 20 even when the second emergency stop cancel button B1 is pressed down.

As described above, in the robot system. 1, the second emergency stop cancel button B1 of the emergency stop processing apparatus 50 is pressed down (operated), and thereby, the state of the emergency stop circuit is held in the energized state even when the first emergency stop button is pressed down. As below, specific examples of configurations of the emergency stop circuits in the robot system 1 will be explained.

Specific Examples of Configurations of Emergency Stop Circuits in Robot System 1

As below, the specific examples of the configurations of the emergency stop circuit in the robot system 1 will be explained with reference to FIGS. 3A to 5. FIGS. 3A to 3D show examples of configurations of the emergency stop circuits in the robot system 1. FIG. 3A shows an example of the configuration of the emergency stop circuit A. FIG. 3B shows an example of the configuration of the emergency stop circuit B.

As described above, the control apparatus 30 makes an emergency stop of the robot 20 when the state of one of the emergency stop circuit A and the emergency stop circuit B changes from the energized state to the non-energized state. That is, the emergency stop circuit A is a backup when the emergency stop circuit B fails, and the emergency stop circuit B is a backup when the emergency stop circuit A fails. Thereby, in the robot system 1, if it is impossible to change the state of one of the emergency stop circuit A and the emergency stop circuit B from the energized state to the non-energized state due to a failure, the control apparatus 30 may be allowed to make an emergency stop of the robot 20 by changing the state of the other normal one from the energized state to the non-energized state.

As shown in FIG. 3A, a path X1 of the control apparatus 30 of the paths forming the emergency stop circuit A is connected to the processing apparatus circuit PA via the cable C1 and the processing apparatus circuit PA is connected to the teaching apparatus circuit TA via the cable C2, and thereby, the emergency stop circuit A is formed. Note that, in FIG. 3A, for simplification of the drawing, the details of the path X1 are omitted.

Hereinafter, of the processing apparatus circuit PA, a path extending from the positive side ((+) shown in FIG. 3A) of the control apparatus 30 to the switch TA1 provided on the teaching apparatus circuit TA is referred to as "path PL1". Further, hereinafter, of the processing apparatus circuit PA, a path extending from the negative side ((−) shown in FIG. 3A) of the control apparatus 30 to the switch TA1 provided on the teaching apparatus circuit TA is referred to as "path NL1".

In the PL1, a switch PA1 and a parallel circuit PC1 are provided sequentially from the control apparatus 30 side to the teaching apparatus 40 side. The parallel circuit PC1 branches the path PL1 into two paths and couples into one path again before the cable C2 from the emergency stop processing apparatus 50. A switch R1 is provided in one path V1 of the branched paths in the parallel circuit PC1. Further, a switch R2 is provided in the other path V2 of the branched paths in the parallel circuit PC1. A path SC1 that connects the path PL1 and the path NL1 is provided between the switch PA1 and the parallel circuit PC1. In the path SC1, two switches, i.e., a switch R3 and a switch R4 are serially provided.

The switch TA1 provided on the teaching apparatus circuit TA is a switch corresponding to the first emergency stop button of the teaching apparatus 40. That is, the state of the switch TA1 is switched to off by pressing down of the first emergency stop button. Further, the switch PA1 provided in the path PL1 is a switch corresponding to the second emergency stop button B2 of the emergency stop processing apparatus 50. That is, the state of the switch PA1 is switched to off by pressing down of the second emergency stop button B2. In the emergency stop circuit A shown in FIG. 3A, the respective states of the three switches of the switch R1, the switch R3, and the switch R4 are off and the state of the switch R2 is on. The states of the switches in the emergency stop circuit A are as shown in FIG. 3A in an initial condition.

In the initial condition, when the state of the switch TA1 is switched to off, the emergency stop circuit A is no longer a closed circuit, and the state of the emergency stop circuit A changes from the energized state to the non-energized state. Thereby, the teaching apparatus 40 allows the control apparatus 30 to make an emergency stop of the robot 20 when the first emergency stop button is pressed down. Further, when the state of the switch PA1 is switched to off in the initial condition of the emergency stop circuit A, the emergency stop circuit A is no longer a closed circuit, and the state of the emergency stop circuit A changes from the energized state to the non-energized state. Thereby, the emergency stop processing apparatus 50 allows the control apparatus 30 to make an emergency stop of the robot 20 when the second emergency stop button B2 is pressed down.

The switch R3 and the switch R4 are switches corresponding to the second emergency stop cancel button B1 of the emergency stop processing apparatus 50. That is, the states of both the switch R3 and the switch R4 are switched to on by pressing down of the second emergency stop cancel button B1. When the state of the switch TA1 is switched to off in the states, the state of the emergency stop circuit A is held in the energized state because the path PL1 and the path NL1 are connected by the path SC1. Thereby, the emergency stop processing apparatus 50 cancels an emergency stop of the robot 20 caused by pressing down of the first emergency stop button when the second emergency stop cancel button B1 is pressed down.

Further, even in the case where the states of both the switch R3 and the switch R4 are switched to on by pressing down of the second emergency stop cancel button B1, the state of the switch PA1 is switched to off when the second emergency stop button B2 is pressed down, and accordingly, the emergency stop circuit A is no longer a closed circuit. Thereby, the state of the emergency stop circuit B changes from the energized state to the non-energized state. That is, as described above, even in the case where the second emergency stop cancel button B1 is pressed down, the emergency stop processing apparatus 50 allows the control apparatus 30 to make an emergency stop of the robot 20 when the second emergency stop button B2 is pressed down.

Note that the switch corresponding to the second emergency stop cancel button B1 may be one of the switch R3 and the switch R4. In this case, in a state in which a switch not corresponding to the second emergency stop cancel button B1 is on, the emergency stop processing apparatus 50 may cancel an emergency stop of the robot 20 by pressing down of the first emergency stop button when the second emergency stop cancel button B1 is pressed down.

In the emergency stop circuit A, the switch R1 and the switch R2 together with the switch R3 and the switch R4 are used for checking whether or not the switch R3 and the switch R4 respectively weld. Processing on the check will be described later.

Further, as shown in FIG. 3B, a path X2 of the control apparatus 30 of the paths forming the emergency stop circuit B is connected to the processing apparatus circuit PB via the cable C1 and the processing apparatus circuit PB is connected to the teaching apparatus circuit TB via the cable C2, and thereby, the emergency stop circuit B is formed. Note that, in FIG. 3B, for simplification of the drawing, the details of the path X2 are omitted.

Hereinafter, of the processing apparatus circuit PB, a path extending from the positive side ((+) shown in FIG. 3B) of the control apparatus 30 to the switch TB1 provided on the teaching apparatus circuit TB is referred to as "path PL2". Further, hereinafter, of the processing apparatus circuit PB, a path extending from the negative side ((−) shown in FIG. 3B) of the control apparatus 30 to the switch TB1 provided on the teaching apparatus circuit TB is referred to as "path NL2".

In the PL2, a switch PB1 and a parallel circuit PC2 are provided sequentially from the control apparatus 30 side to the teaching apparatus 40 side. The parallel circuit PC2 branches the path PL2 into two paths and couples into one path again before the cable C2 from the emergency stop processing apparatus 50. A switch R5 is provided in one path V3 of the branched paths in the parallel circuit PC2. Further, a switch R6 is provided in the other path V4 of the branched paths in the parallel circuit PC2. A path SC2 that connects the path PL2 and the path NL2 is provided between the switch PB1 and the parallel circuit PC2. In the path SC2, two switches, i.e., a switch R7 and a switch R8 are serially provided.

The switch TB1 provided on the teaching apparatus circuit TB shows a switch corresponding to the first emergency stop button of the teaching apparatus 40. That is, the state of the switch TB1 is switched to off by pressing down of the first emergency stop button. Further, the switch PB1 provided in the path PL2 shows a switch corresponding to the second emergency stop button B2 of the emergency stop processing apparatus 50. That is, the state of the switch PB1 is switched to off by pressing down of the second emergency stop button B2. In the emergency stop circuit B shown in FIG. 3B, the respective states of the three switches of the switch R5, the switch R7, and the switch R8 are off and the state of the switch R6 is on. The states of the switches in the emergency stop circuit B are as shown in FIG. 3B in an initial condition.

In the initial condition, when the state of the switch TB1 is switched to off, the emergency stop circuit B is no longer a closed circuit, and the state of the emergency stop circuit B changes from the energized state to the non-energized state. Thereby, the teaching apparatus 40 allows the control apparatus 30 to make an emergency stop of the robot 20 when the first emergency stop button is pressed down. Further, when the state of the switch PB1 is switched to off in the initial condition of the emergency stop circuit B, the emergency stop circuit B is no longer a closed circuit, and the state of the emergency stop circuit B changes from the energized state to the non-energized state. Thereby, the emergency stop processing apparatus 50 allows the control apparatus 30 to make an emergency stop of the robot 20 when the second emergency stop button B2 is pressed down.

The switch R7 and the switch R8 show switches corresponding to the second emergency stop cancel button B1 of the emergency stop processing apparatus 50. That is, the states of both the switch R7 and the switch R8 are switched to on by pressing down of the second emergency stop cancel button B1. When the state of the switch TB1 is switched to off in the states, the state of the emergency stop circuit B is held in the energized state because the path PL2 and the path NL2 are connected by the path SC2. Thereby, the emergency stop processing apparatus 50 cancels an emergency stop of the robot 20 caused by pressing down of the emergency stop button when the second emergency stop cancel button B1 is pressed down.

Further, even in the case where the states of both the switch R7 and the switch R8 are switched to on by pressing down of the second emergency stop cancel button B1, the state of the switch PB1 is switched to off when the second emergency stop button B2 is pressed down, and accordingly, the emergency stop circuit B is no longer a closed circuit. Thereby, the state of the emergency stop circuit B changes from the energized state to the non-energized state. That is, as described above, even in the case where the second emergency stop cancel button B1 is pressed down, the emergency stop processing apparatus 50 allows the control apparatus 30 to make an emergency stop of the robot 20 when the second emergency stop button B2 is pressed down.

Note that the switch corresponding to the second emergency stop cancel button B1 may be one of the switch R7 and the switch R8. In this case, in a state in which a switch not corresponding to the second emergency stop cancel button B1 is on, the emergency stop processing apparatus 50 may cancel an emergency stop of the robot 20 caused by pressing down of the first emergency stop button when the second emergency stop cancel button B1 is pressed down.

In the emergency stop circuit B, the switch R5 and the switch R6 together with the switch R7 and the switch R8 are used for checking whether or not the switch R7 and the switch R8 respectively weld. Processing on the check will be described later.

Welding Check Processing of Emergency Stop Circuits in Robot System 1

As below, welding check processing of checking whether or not the switch R3 and the switch R4 of the emergency stop circuit A and the switch R7 and the switch R8 of the emergency stop circuit B respectively weld will be explained.

The switch R1 to switch R4 shown in FIG. 3A and the switch R5 to switch R8 shown in FIG. 3B are e.g. safety relay switches. These safety relay switches are operated by respective two CPUs of the emergency stop processing apparatus 50, i.e., a first CPU (Central Processing Unit) 51 and a second CPU 52.

FIG. 3C shows an example of the safety relay switches operated by the first CPU 51. The first CPU 51 operates the two safety relay switches, i.e. a switch RS1 and a switch RS2. The switch RS1 corresponds to the switch R2. When the first CPU 51 switches the state of the switch RS1 to on, the state of the switch R2 is switched to off. On the other hand, when the first CPU 51 switches the state of the switch RS1 to off, the state of the switch R2 is switched to on. The first CPU 51 determines that the switch R2 welds (in other words, detects welding of the switch R2) if the state of the switch R2 is not switched to off when the state of the switch RS1 is switched to on.

Further, the switch RS2 corresponds to the switch R1, the switch R3, and the switch R7. When the first CPU 51 switches the state of the switch RS2 to on, the respective states of the switch R1, the switch R3, and the switch R7 are switched to off. On the other hand, when the first CPU 51 switches the state of the switch RS2 to off, the respective states of the switch R1, the switch R3, and the switch R7 are switched to on.

The first CPU 51 determines that the switch R1 welds (in other words, detects welding of the switch R1) if the state of the switch R1 is not switched to off when the state of the switch RS2 is switched to on. Further, the first CPU 51 determines that the switch R3 welds (in other words, detects welding of the switch R3) if the state of the switch R3 is not switched to off when the state of the switch RS2 is switched to on. Furthermore, the first CPU 51 determines that the switch R7 welds (in other words, detects welding of the switch R7) if the state of the switch R7 is not switched to off when the state of the switch RS2 is switched to on. The first CPU 51 is an example of a first processor.

FIG. 3D shows an example of the safety relay switches operated by the second CPU 52. The second CPU 52 operates the two safety relay switches, i.e. a switch RS3 and a switch RS4. The switch RS3 corresponds to the switch R6. When the second CPU 52 switches the state of the switch RS3 to on, the state of the switch R6 is switched to off. On the other hand, when the second CPU 52 switches the state of the switch RS3 to off, the state of the switch R6 is switched to on. The second CPU 52 determines that the switch R6 welds (in other words, detects welding of the switch R6) if the state of the switch R6 is not switched to off when the state of the switch RS3 is switched to on.

Further, the switch RS4 corresponds to the switch R4, the switch R5, and the switch R8. When the second CPU 52 switches the state of the switch RS4 to on, the respective states of the switch R4, the switch R5, and the switch R8 are switched to off. On the other hand, when the second CPU 52 switches the state of the switch RS4 to off, the respective states of the switch R4, the switch R5, and the switch R8 are switched to on.

The second CPU 52 determines that the switch R4 welds (in other words, detects welding of the switch R4) if the state of the switch R4 is not switched to off when the state of the switch RS4 is switched to on. Further, the second CPU 52 determines that the switch R5 welds (in other words, detects welding of the switch R5) if the state of the switch R5 is not switched to off when the state of the switch RS4 is switched to on. Furthermore, the second CPU 52 determines that the switch R8 welds (in other words, detects welding of the switch R8) if the state of the switch R8 is not switched to off when the state of the switch RS4 is switched to on. The second CPU 52 is an example of a second processor.

The first CPU 51 and the second CPU 52 hold the switch R2 and the switch R6 in the on states and hold the switch R1, the switch R3 to the switch R5, the switch R7, and the switch R8 in the off states unless the welding check processing is performed. This is the same condition as the above described initial condition of the emergency stop circuit A and the emergency stop circuit B. Hereinafter, for convenience of explanation, the same condition as the initial condition is referred to as "normal condition". On the other hand, in the case of the welding check processing, the first CPU 51 and the second CPU 52 change the states of these eight switches from the normal condition while executing e.g. processing of a flow chart shown in FIG. 4, and thereby, check whether or not the switch R3, the switch R4, the switch R7, and the switch R8 respectively weld. By the check, the first CPU 51 and the second CPU 52 detect (specify) the welding switch if one of the switch R3, the switch R4, the switch R7, and the switch R8 welds.

Figure 4:
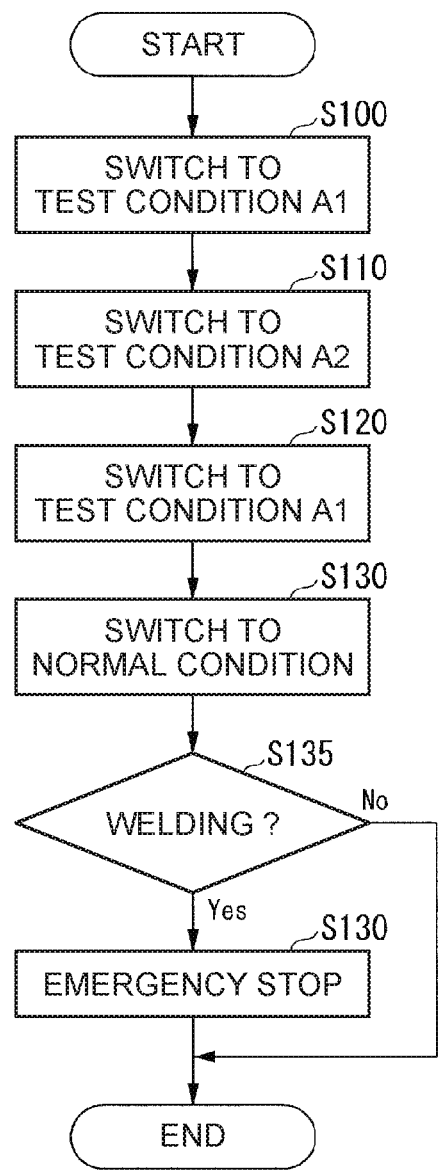
FIG. 4 is a flowchart showing an example of a flow of welding check processing performed by a first CPU and a second CPU.

FIG. 4 is a flowchart showing an example of a flow of the welding check processing performed by the first CPU 51 and the second CPU 52. For example, the first CPU 51 and the second CPU 52 perform the welding check processing at each time after a predetermined period lapses. Further, the first CPU 51 and the second CPU 52 perform the welding check processing while holding the states of the emergency stop circuits in the energized states. Note that the first CPU 51 and the second CPU 52 may perform the welding check processing at other times such as each time when the control apparatus 30 is started instead. Hereinafter, the condition of the switch R1 to the switch R8 provided in the processing apparatus circuit PA and the processing apparatus circuit PB before the processing at step S100 is performed are referred to as "normal condition".

Figure 5A:
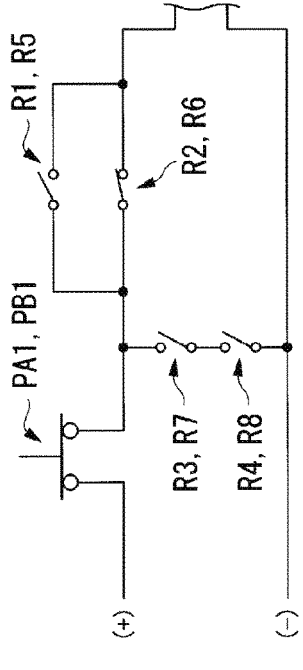
FIGS. 5A to 5C respectively show examples of three states switched by the first CPU and the second CPU in the welding check processing of states of switch to switch provided in a processing apparatus circuit and a processing apparatus circuit.
Figure 5B:
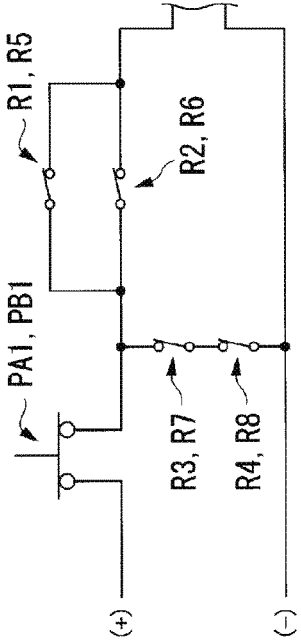
Figure 5C:
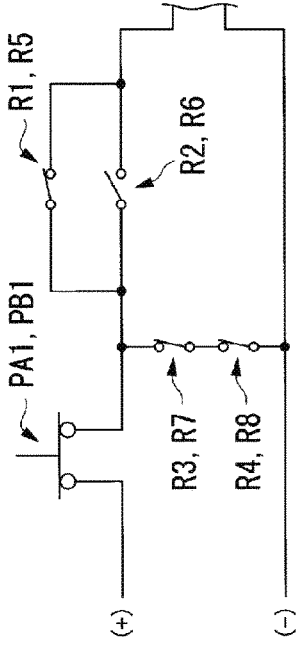

The first CPU 51 and the second CPU 52 switch the condition of the switch R1 to switch R8 provided in the processing apparatus circuit PA and the processing apparatus circuit PB from the normal condition to a test condition A1 shown in FIG. 5B (step S100). Here, the test condition A1 is explained. FIGS. 5A to 5C respectively show examples of three conditions switched by the first CPU 51 and the second CPU 52 in the welding check processing of the conditions of the switch R1 to the switch R8 provided in the processing apparatus circuit PA and the processing apparatus circuit PB. Here, in FIGS. 5A to 5C, the configuration of the processing apparatus circuit PA and the configuration of the processing apparatus circuit PB are the same, and the configurations are shown with signs of the processing apparatus circuit PA and signs of the processing apparatus circuit PB to the configurations.

FIG. 5A shows an example of the normal condition of the conditions of the switch R1 to the switch R8 provided in the processing apparatus circuit PA and the processing apparatus circuit PB. Further, FIG. 5B shows an example of the test condition A1 of the conditions of the switch R1 to the switch R8 provided in the processing apparatus circuit PA and the processing apparatus circuit PB.

The normal condition shown in FIG. 5A is the same as the initial condition shown in FIGS. 3A to 3D (i.e., the normal condition) of the conditions of the switch R1 to the switch R8 provided in the processing apparatus circuit PA and the processing apparatus circuit PB, and the explanation will be omitted. In the test condition A1 shown in FIG. 5B, the first CPU 51 and the second CPU 52 hold the states of the switch RS1 and the switch RS3 off and switch the states of the switch RS2 and the switch RS4 to off. Thereby, the first CPU 51 and the second CPU 52 realize a condition in which all of the states of the switch R1 to the switch R8 provided in the processing apparatus circuit PA and the processing apparatus circuit PB are on.

The first CPU 51 and the second CPU 52 execute the processing at step S100 as a preparation for checking whether or not the switches weld, and switch the condition of the switch R1 to the switch R8 provided in the processing apparatus circuit PA and the processing apparatus circuit PB from the normal condition to the test condition A1.

Then, the first CPU 51 and the second CPU 52 switch the condition of the switch R1 to the switch R8 provided in the processing apparatus circuit PA and the processing apparatus circuit PB from the test condition A1 to a test condition A2 (step S110). Here, referring to FIGS. 5A to 5C again, the test condition A2 is explained. FIG. 5C shows an example of the test condition A2 of the conditions of the switch R1 to the switch R8 provided in the processing apparatus circuit PA and the processing apparatus circuit PB.

In the test condition A2 shown in FIG. 5C, the first CPU 51 and the second CPU 52 switch the states of the switch RS1 and the switch RS3 to on and hold the states of the switch RS2 and the switch RS4 off. Thereby, the first CPU 51 and the second CPU 52 switch the states of the switch R2 and the switch R6 to the off states of the switch R1 to the switch R8 provided in the processing apparatus circuit PA and the processing apparatus circuit PB.

The condition of the switch R1 to the switch R8 provided in the processing apparatus circuit PA and the processing apparatus circuit PB is switched from the test condition A1 to the test condition A2, and thereby, the first CPU 51 and the second CPU 52 may detect whether or not the switch R2 and the switch R6 respectively weld. The respective switch R2 and switch R6 are the safety relay switches as described above. Accordingly, if the switch R2 welds, the first CPU 51 may detect that the switch R2 welds through processing from step S100 to step S110. Further, if switch R6 welds, the second CPU 52 may detect that the switch R6 welds through processing from step S100 to step S110.

Then, the first CPU 51 and the second CPU 52 switch the condition of the switch R1 to the switch R8 provided in the processing apparatus circuit PA and the processing apparatus circuit PB from the test condition A2 to the test condition A1 again (step S120). The first CPU 51 and the second CPU 52 switch the condition of the switch R1 to the switch R8 provided in the processing apparatus circuit PA and the processing apparatus circuit PB from the test condition A2 to the test condition A1 again as a preparation for checking whether or not the respective other six safety relay switches than the switch R2 and the switch R6 weld.

Then, the first CPU 51 and the second CPU 52 switch the condition of the switch R1 to the switch R8 provided in the processing apparatus circuit PA and the processing apparatus circuit PB from the test condition A2 to the normal condition (step S130). By switching the condition of the switch R1 to the switch R8 provided in the processing apparatus circuit PA and the processing apparatus circuit PB from the test condition A2 to the normal condition, the first CPU 51 and the second CPU 52 may detect whether or not the respective switch R1, switch R3 to switch R5, switch R7, and switch R8 weld.

The respective switch R1, switch R3 to switch R5, switch R7, and switch R8 are the safety relay switches as described above. Accordingly, if one of the switch R1, the switch R3, and the switch R7 welds, the first CPU 51 may detect the welding switch of the switch R1, the switch R3, and the switch R7 through processing from step S100 to step S110. Further, if one of the switch R4, the switch R5, and the switch R8 welds, the second CPU 52 may detect the welding switch of the switch R4, the switch R5, and the switch R8 through the processing from step S100 to step S110.

Then, the first CPU 51 and the second CPU 52 determine whether or not the welding switch has been detected at step S110 and step S130 (step S135). If determining that the welding switch has been detected at step S110 and step S130 (step S135—Yes), the first CPU 51 and the second CPU 52 allow the control apparatus 30 to make an emergency stop of the robot 20 (step S130). In this regard, the first CPU 51 and the second CPU 52 turn on light in the display part L2 of the emergency stop processing apparatus 50 and end the processing. On the other hand, if determining that the welding switch has not been detected at step S110 and step S130 (step S135-No), the first CPU 51 and the second CPU 52 end the processing because welding (failure) has not occurred. Note that part or all of the switch R1 to the switch R8 are examples of relays. Further, part or all of the switch R1, the switch R2, the switch R3, and the switch R7 whose conditions are switched by the first CPU 51 are examples of first relays. Furthermore, part or all of the switch R4, the switch R5, the switch R6, and the switch R8 whose conditions are switched by the second CPU 52 are examples of second relays.

As described above, the first CPU 51 and the second CPU 52 suppress unintentional cancellation of an emergency stop by performing the welding check processing, and, as a result, safety may be improved. However, if an emergency stop is cancelled and one of the first CPU 51 and the second CPU 52 fails, cancellation of an emergency stop may be unintentionally continued. To suppress that, the first CPU 51 and the second CPU 52 perform failure check processing of checking whether or not a failure occurs with each other. As below, the failure check processing will be explained.

Failure Check Processing of First CPU 51 and Second CPU 52

The first CPU 51 of the emergency stop processing apparatus 50 includes a first clock part (not shown) that clocks times. Further, the first CPU 51 continues to transmit clock signals on a predetermined clock cycle based on the times clocked by the first clock part. Furthermore, the first CPU 51 receives clock signals from the second CPU 52. When the clock cycle of the received clock signals changes, the first CPU 51 determines that the second CPU 52 has failed and allows the control apparatus 30 to make an emergency stop of the robot 20. Then, the first CPU 51 turns on light in the display part L2.

The second CPU 52 of the emergency stop processing apparatus 50 includes a second clock part (not shown) that clocks times. Further, the second CPU 52 continues to transmit clock signals on a predetermined clock cycle based on the times clocked by the second clock part. Furthermore, the second CPU 52 receives the clock signals from the first CPU 51. When the clock cycle of the received clock signals changes, the second CPU 52 determines that the first CPU 51 has failed and allows the control apparatus 30 to make an emergency stop of the robot 20. Then, the second CPU 52 turns on light in the display part L2.

Figure 6:
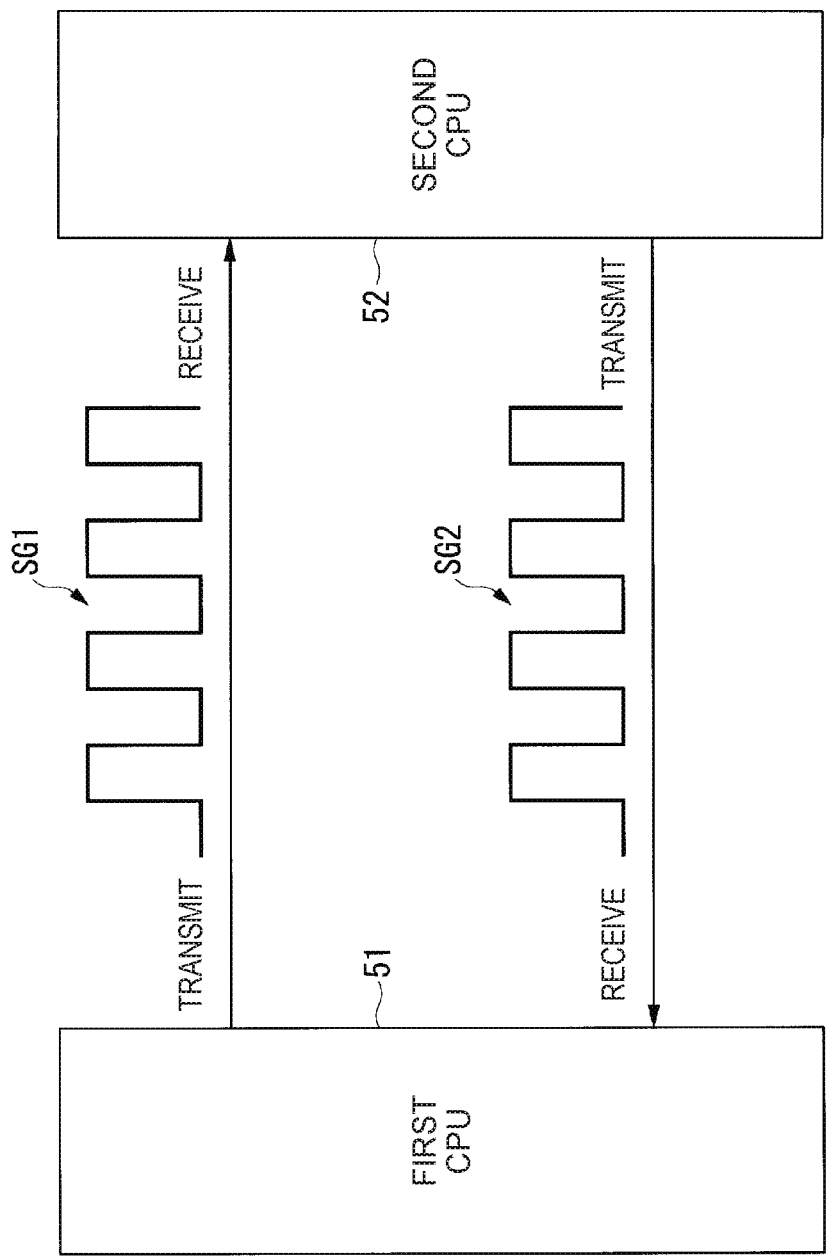
FIG. 6 is a conceptual diagram showing failure check processing mutually performed by the first CPU and the second CPU using clock signals.

FIG. 6 is a conceptual diagram showing failure check processing mutually performed by the first CPU 51 and the second CPU 52 using clock signals. As shown in FIG. 6, the first CPU 51 continues to transmit clock signals SG1 to the second CPU 52. The second CPU 52 continues to receive the clock signals SG1 from the first CPU 51. On the other hand, the second CPU 52 continues to transmit clock signals SG2 to the first CPU 51. The first CPU 51 continues to receive the clock signals SG2 from the second CPU 52.

Thereby, the first CPU 51 and the second CPU 52 may suppress unintentional continued cancellation of an emergency stop even in the case where one of the first CPU 51 and the second CPU 52 fails when an emergency stop is cancelled.

Emergency Stop Processing Apparatus 50 and Attachment Jig Therefor.

As below, referring to FIGS. 7A to 8C, fixing of the emergency stop processing apparatus 50 in a location where the robot 20 is allowed to perform work within a factory or the like will be explained. FIGS. 7A to 7C show an example of the appearance of the emergency stop processing apparatus 50 and an example of a jig for fixing the emergency stop processing apparatus 50. FIG. 7A is a top view of the emergency stop processing apparatus 50 when a surface on which the second emergency stop cancel button B1 is provided in the emergency stop processing apparatus 50 is set as a top surface. The explanation of the top view of the emergency stop processing apparatus 50 shown in FIG. 7A has been already explained in FIG. 2 and the explanation is omitted.

Hereinafter, as shown in FIGS. 7A to 7C, the surface on which the second emergency stop cancel button B1 is provided in the emergency stop processing apparatus 50 is referred to as "zeroth surface M0". Further, a surface adjacent to the zeroth surface, on which the cable C1 and the cable C2 are attached in the emergency stop processing apparatus 50 is referred to as "first surface M1". Hereinafter, when the emergency stop processing apparatus 50 is seen from the first surface M1 with the zeroth surface M0 facing up, a surface adjacent to the first surface M1 on the left side is referred to as "second surface M2" and a surface adjacent to the first surface M1 on the right side is referred to as "third surface M3". Further, hereinafter, in the emergency stop processing apparatus 50, a surface opposite to the first surface is referred to as "fourth surface M4" and a surface opposite to the zeroth surface is referred to as "fifth surface M5".

Four screw hole portions for fastening of screws are respectively provided in the second surface M2 and the third surface M3. Here, FIG. 7B shows an example of a side view of the emergency stop processing apparatus 50 when the third surface M3 is set as a side surface. As shown in FIG. 7B, the four screw hole portions T1 to T4 are provided in the third surface M3. The numbers of screw hole portions respectively provided in the second surface M2 and the third surface M3 may be three or less or five or more in place of four.

FIG. 7C shows the jig for fixing the emergency stop processing apparatus 50 to a floor surface, a wall surface, or the like. The jig G shown in FIG. 7C is e.g. a fixing L-shaped plate. Screw hole portions T5 to T8 through which screws pass are provided in the jig G. For example, the screw hole portions T5 to T8 and the screw hole portions T1 to T4 provided in the third surface M3 of the emergency stop processing apparatus 50 are used, and thereby, the jig G may be attached from one direction of three directions to the emergency stop processing apparatus 50. Hereinafter, for convenience of explanation, of surfaces of the jig G on which the screw hole portion T7 and the screw hole portion T8 are provided, a surface on the back side of the surface on the side from which the surface of the jig G with the screw hole portion T5 and the screw hole portion T6 projects is referred to as "sixth surface M6".

Figure 8B:
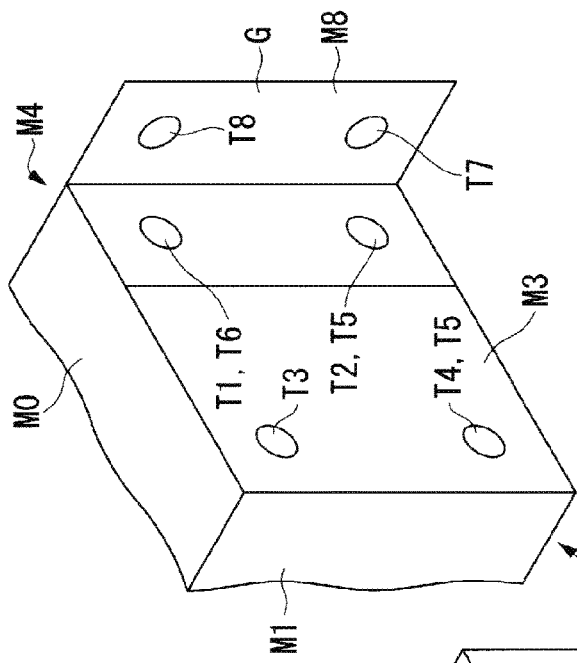
FIGS. 8A to 8C illustrate states in which a jig is attached to the emergency stop processing apparatus respectively from three directions.
Figure 8C:
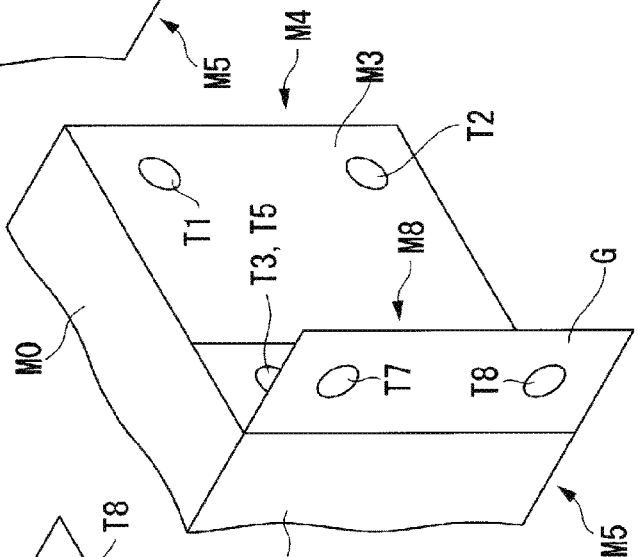
Figure 8A:
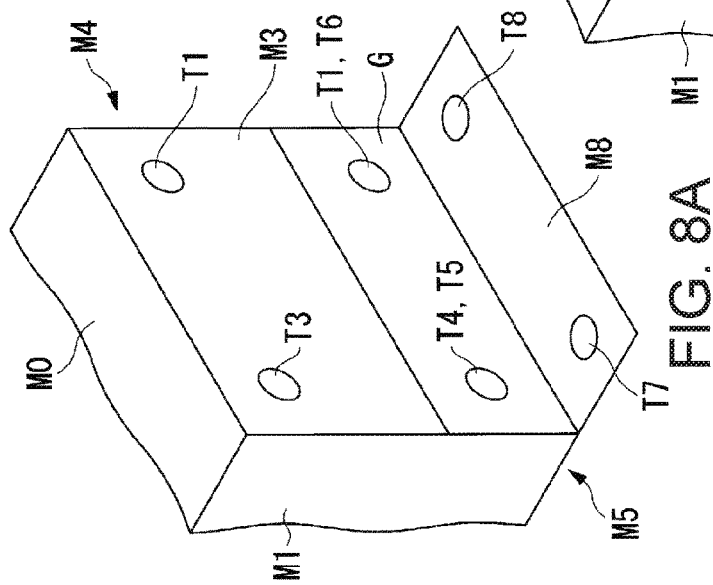

FIGS. 8A to 8C illustrate states in which the jig G is attached to the emergency stop processing apparatus 50 respectively from the three directions. FIG. 8A shows the state in which the jig G is attached so that the fifth surface M5 and the sixth surface M6 are in parallel to the emergency stop processing apparatus 50. FIG. 8B shows the state in which the jig G is attached so that the fourth surface M4 and the sixth surface M6 are in parallel to the emergency stop processing apparatus 50. FIG. 8C shows the state in which the jig G is attached so that the first surface M1 and the sixth surface M6 are in parallel to the emergency stop processing apparatus 50. In the emergency stop processing apparatus 50, one of the three attachment ways shown in FIGS. 8A to 8C is selected, and thereby, the jig G may be attached to a position suitable for an installation location.

Note that the surfaces to which the jig G can be attached of the surfaces of the emergency stop processing apparatus 50 are not limited to the second surface M2 and the third surface M3, but may be other surfaces. Further, the jig G may be a jig having another shape in place of the fixing L-shaped plate. Part or all of the screw hole portions T1 to T4 are examples of fixing portions.

As described above, the robot system 1 in a modified example of the embodiment makes an emergency stop of a motion of the robot by the first operation part of the teaching apparatus 40 (in the example, the first emergency stop button) and operates the first operation part by the second operation part of the emergency stop processing apparatus 50 as the second operation part separate from the control apparatus 30 (in the example, the second emergency stop cancel button B1), and then, continues the motion of the robot 20. Thereby, the robot system 1 may improve the efficiency of teaching work.

Further, in the robot system 1, the first operation part is operated by the emergency stop processing apparatus 50 communicably connected between the control apparatus 30 and the teaching apparatus 40, and then, the motion of the robot 20 is continued. Thereby, the robot system 1 may improve the efficiency of teaching work by the emergency stop processing apparatus 50 communicably connected between the control apparatus 30 and the teaching apparatus 40.

Furthermore, the robot system 1 informs that the second operation part has been operated, by the informing part (in the example, the display part L1). Thereby, the robot system 1 may inform the user that the second operation part has been operated by the informing part. As a result, the robot system 1 may suppress detachment of the teaching apparatus by the user in a state in which the second operation part is not operated.

The robot system 1 makes an emergency stop of the motion of the robot 20 by the third operation part of the emergency stop processing apparatus 50 (in the example, the second emergency stop button B2). Thereby, the robot system 1 may make an emergency stop of the robot 20 even when the teaching apparatus 40 is detached.

Further, the robot system 1 switches the relays (in the example, the switch R3, the switch R4, the switch R7, the switch R8) by the second operation part of the emergency stop processing apparatus 50. Thereby, the robot system 1 may continue the motion of the robot 20 after the first operation part is operated based on switching of the relays by the second operation part.

Furthermore, the robot system 1 switches the relays by the first CPU 51 and the second CPU 52. Thereby, the robot system 1 may continue the motion of the robot 20 after the first operation part is operated as a result of switching of the relays by the first CPU 51 and the second CPU 52.

The robot system 1 allows the first CPU 51 to monitor the second CPU 52 and allows the second CPU 52 to monitor the first CPU 51. Thereby, the robot system 1 may monitor the first CPU 51 and the second CPU 52.

Further, in the robot system 1, the first relays (in the example, the switch R1 to the switch R3, the switch R7) are switched by the first CPU 51 and the second relays (in the example, the switch R4 to the switch R6, the switch R8) are switched by the second CPU 52. Thereby, the robot system 1 may switch the first relays and the second relays by the different processors.

Furthermore, in the robot system 1, the jig G is fixed to the emergency stop processing apparatus 50 using one of the plurality of fixing portions (in the example, the screw hole portion T1 to the screw hole portion T4). Thereby, the robot system 1 may fix the emergency stop processing apparatus 50 using the fixing portion suitable for a location to fix.

As above, the embodiments of the invention are described in detail with reference to the drawings. The specific configurations are not limited to the embodiments and changes, replacements, deletions, etc. may be made without departing from the scope of the invention.

A program for realizing a function of an arbitrary configuration part in the above described apparatus (e.g. the emergency stop processing apparatus 50) may be recorded in a computer-readable recording medium and the program may be read into a computer system and executed. Note that "computer system" here includes an OS (Operating System) and a hardware such as a peripheral. Further, "computer-readable recording medium" refers to a portable medium such as a flexible disk, a magnetooptical disk, a ROM, a CD (Compact Disk)-ROM and a storage device such as a hard disk built in the computer system. Furthermore, "computer-readable recording medium" includes a medium that holds a program in a fixed period such as a volatile memory (RAM) within the computer system serving as a server or client when the program is transmitted via a network such as the Internet or a communication line such as a phone line.

The program may be transmitted from the computer system in which the program is stored in a memory device or the like via a transmission medium or transmission wave within the transmission medium to another computer system. Here, "transmission medium" for transmission of the program refers to a medium having a function of transmitting information such as a network (communication network) such as the Internet or a communication line such as a phone line.

Further, the program may realize part of the above described function. Furthermore, the program may realize the above described function in combination with a program that has been already recorded in the computer system, the so-called differential file (differential program).

The entire disclosure of Japanese Patent Application No. 2015-111142, filed Jun. 1, 2015 is expressly incorporated by reference herein.

What is claimed is:

1. A robot system comprising:
a robot that includes an actuator;
a control apparatus that is communicably connected to the actuator via a control communication member, the control apparatus being enclosed in a first body, the control apparatus being configured to control the robot by sending a control signal to the actuator via the control communication member;
an emergency stop processing apparatus that is communicably connected to the control apparatus via an emergency communication member, the emergency stop processing apparatus being enclosed in a second body which is separately provided from the first body, the emergency stop processing apparatus having a first operation switch, the first operation switch being configured to cancel emergency stop of a motion of the robot so as to restart the motion of the robot when the first operation switch is activated;
a teaching apparatus that includes a second operation switch, the teaching apparatus being communicably connected to the emergency stop processing apparatus via a teaching communication member, the teaching apparatus being enclosed in a third body which is separately provided from the first and second bodies, the teaching apparatus being configured to teach the control apparatus with respect to the motion of the robot via the teaching communication member and the emergency communication member, the second operation switch being configured to make the emergency stop of the motion of the robot when the second operation switch is activated; and
an emergency stop circuit that is configured by communicably connecting the control apparatus, the emergency stop processing apparatus, and the teaching apparatus to each other,
wherein the control apparatus is communicably connected to the teaching apparatus via the emergency communication member, the emergency stop processing apparatus, and the teaching communication member,
wherein when the second operation switch is activated, the emergency circuit becomes a non-conduction state, and when the control apparatus detects the non-conduction state, the control apparatus is configured to stop the motion of the robot, and
when the first operation switch is activated while the emergency circuit is in the non-conduction state, the emergency circuit becomes a conduction state, and when the control apparatus detects the conduction state, the control apparatus is configured to re-start the motion of the robot.

2. The robot system according to claim 1,
wherein the emergency stop processing apparatus includes an indication display which indicates whether the first operation switch is activated.

3. The robot system according to claim 1,
wherein the emergency stop processing apparatus includes a third operation switch that is configured to make the emergency stop of the motion of the robot.

4. The robot system according to claim 1,
wherein the emergency stop processing apparatus is configured to switch relays when the first operation switch is activated.

5. The robot system according to claim 4,
wherein the emergency stop processing apparatus includes a first processor and a second processor that are configured to switch the relays.

6. The robot system according to claim 5,
wherein the first processor and the second processor are configured to monitor each other.

7. The robot system according to claim 5,
wherein the relays include first relays and second relays, and
the emergency stop processing apparatus is configured to switch the first relays by the first processor and is configured to switch the second relays by the second processor.

8. The robot system according to claim 1, wherein the emergency stop processing apparatus includes a plurality of fixing portions that fix a jig to the emergency stop processing apparatus.

9. The robot system according to claim 1,
wherein the emergency stop circuit has a first circuit switch, and the first circuit switch is physically located in the teaching apparatus in the third body,
the emergency stop circuit has a second circuit switch, and the second circuit switch is physically located in the emergency stop processing apparatus in the second body,
when the second operation switch is activated, the first circuit switch is turned OFF, and when the control apparatus detects the OFF state of the first circuit switch, the control apparatus is configured to stop the motion of the robot, and
when the first operation switch is activated, the second circuit switch is turned ON, and when the control apparatus detects the ON state of the second circuit switch, the control apparatus is configured to re-start the motion of the robot.

10. The robot system according to claim 1,
wherein the emergency communication member and the teaching communication member are first and second physical communication cables, respectively,
the first physical communication cable is detachable from the control apparatus and the emergency stop processing apparatus, and
the second physical communication cable is detachable from the emergency stop processing apparatus and the teaching apparatus.

* * * * *